(12) United States Patent
Baettig et al.

(10) Patent No.: US 7,632,345 B2
(45) Date of Patent: Dec. 15, 2009

(54) PHTHALOCYANINE DYES AND THEIR PREPARATION AND USE

(75) Inventors: Kurt Baettig, Le Mouret (CH); Gérald Jan, Villars-sur-Glâne (CH)

(73) Assignee: Ilford Imaging Switzerland GmbH (CH)

( * ) Notice: Subject to any disclaimer, the term of this patent is extended or adjusted under 35 U.S.C. 154(b) by 64 days.

(21) Appl. No.: 11/818,231

(22) Filed: Jun. 13, 2007

(65) Prior Publication Data

US 2008/0257210 A1   Oct. 23, 2008

(30) Foreign Application Priority Data

Jun. 13, 2006   (EP) .................................. 06115415

(51) Int. Cl.
*C09D 11/02* (2006.01)
*C09B 47/04* (2006.01)
*B41J 2/01* (2006.01)

(52) U.S. Cl. ...................... 106/31.49; 540/129; 347/100

(58) Field of Classification Search ............... 106/31.49; 540/129; 347/100
See application file for complete search history.

(56) References Cited

U.S. PATENT DOCUMENTS 4,626,284 A    12/1986   Ohta et al.

(Continued)

FOREIGN PATENT DOCUMENTS

DE          1205639          4/1961

(Continued)

OTHER PUBLICATIONS

J. He, G. Benkö, F. Korodi, T. Polivka, R. Lomoth, B. Åkermark, L. Sun, A. Hagfeldt and V. Sundström "Modified Phthalocyanines for Efficient Near-IR Sensitization of Nanostructured TiO₂ Electrode", Journal of the American Chemical Society 124, 4922-4932, Apr. 2002.

(Continued)

*Primary Examiner*—Helene Klemanski
(74) *Attorney, Agent, or Firm*—Dara L. Onofrio, Esq.; Onofrio Law

(57) ABSTRACT

Phthalocyanine dyes of general formula (II)

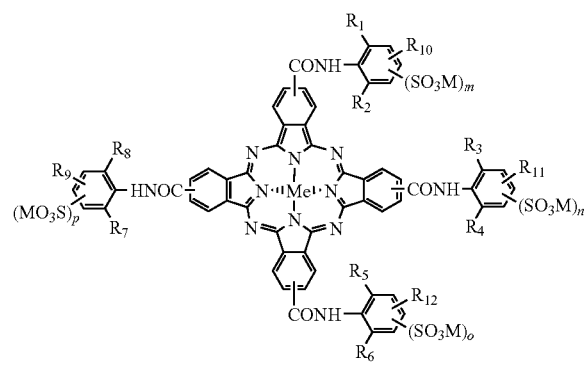

(II)

and, in particular, of general formula (III)

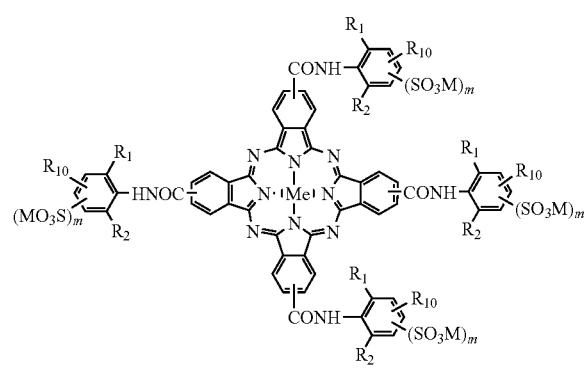

(III)

wherein $R_1$-$R_8$, $R_9$-$R_{12}$, Me, M, m, n, o and p are as defined in the specification, are excellent dyes for dying and printing cellose containing materials and textile materials, and especially, for the preparation of inks for ink jet printing.

11 Claims, 1 Drawing Sheet

Normalised Absorption Spectrum on ILFORD PrintasiaTM Premium Photo Glossy Paper PRNGP1

U.S. PATENT DOCUMENTS

| | | | |
|---|---|---|---|
| 4,703,113 A | | 10/1987 | Baxter et al. |
| 4,963,189 A | | 10/1990 | Hindagolla |
| 5,296,034 A | * | 3/1994 | Dietz et al. ................. 106/412 |
| 6,221,137 B1 | * | 4/2001 | King et al. ................. 540/129 |
| 6,508,873 B1 | * | 1/2003 | Shawcross et al. ....... 106/31.49 |
| 2003/0041775 A1 | | 3/2003 | Deardurff et al. |
| 2009/0155177 A1 | * | 6/2009 | Baettig et al. ............... 540/129 |

FOREIGN PATENT DOCUMENTS

| | | |
|---|---|---|
| EP | 0425150 A2 | 5/1991 |
| EP | 0597672 A2 | 5/1994 |
| EP | 1405883 A1 | 4/2004 |
| EP | 1473335 A1 | 11/2004 |
| EP | 1475417 A1 | 11/2004 |
| GB | 952606 | 3/1964 |
| GB | 2289473 A | 11/1995 |
| GB | 2301109 A | 5/1996 |
| JP | 09-249814 | 9/1997 |
| JP | 2003-213153 A | 7/2003 |

OTHER PUBLICATIONS

G. J. P. Britosek, G. Y. Y Wood and N. Assavathorn, "Synthesis and reactivity of water-soluble platinum (II) complexes containing nitrogen ligands", Journal of Organometallic Chemistry 679, 110-115, Jun. 2003.

R. A. Barcock and A. J. Lavery, "Ozone Degradation of Ink Jet Photoquality Images", Journal of Imaging Science and Technology 48, 153-159, Mar. 2004.

M. Fryberg, "Dyes for ink-jet printing", Review of Progress in Coloration 35, 1-30 (2005).

M. Hannack, H. Heckmann and R. Polley, "Phthlocyanines and Related Compounds" 1998, vol. E 9d of Houben-Weyl, Methods of Organic Chemistry, ISBN 3-13-101614-0, pp. 717-842, Feb. 1998.

F.P Chen and D.Y. Xu "Synthesis of Water Soluble Phthalocyanines", Chinese Journal of Organic Chemistry 10, 550-553 (1990) (English Abstract).

* cited by examiner

PHTHALOCYANINE DYES AND THEIR PREPARATION AND USE

FIELD OF THE INVENTION

The invention relates to novel substituted, water-soluble phthalocyanine dyes having an excellent stability against degradation by ozone, their salts, a method of their preparation and their use in dying and printing operations. It relates also to liquid dye preparations containing these dyes, particularly to aqueous inks for ink jet printing.

BACKGROUND OF THE INVENTION

The speed of modern ink jet printers is steadily increasing for economic reasons. Recording sheets particularly suitable for these printers need to absorb the inks very rapidly. Recording sheets particularly suitable for this purpose comprise nanoporous inorganic compounds, preferably oxides, such as aluminum oxides or silicon dioxide, or oxide/hydroxides, such as aluminum oxide/hydroxides. Such recording sheets are known as "nanoporous" recording sheets. Particularly preferred nanoporous recording sheets are, for economic reasons, those containing, fumed silicon dioxide having a positively charged surface as nanoporous inorganic oxide.

Nanoporous recording sheets absorb the inks very rapidly (in the micro-second range) by the action of the capillary forces of the nanoporous compounds. Polymer based recording sheets absorb the inks more slowly (in the millisecond range) by swelling of the polymer.

Images produced in this way need to have excellent storage stability even under adverse conditions. This can only be achieved by using a finely tuned system of inks (respectively the dyes contained therein) adapted to these nanoporous recording sheets.

Such recording sheets do not have all the properties required when printed with most of the inks available today. In particular, the storage stability of images printed onto these recording sheets has to be improved. These images are not stable when they are in contact with ambient air, which normally contains impurities such as ozone and/or nitrogen oxides. They are strongly altered or even destroyed in a short time when they are in contact with ambient air. This phenomenon, also known as missing stability against degradation by ozone, is described for example by R. A. Barcock and A. J. Lavery in "Ozone Degradation of Ink Jet Photo Quality Images", Journal of Imaging Science and Technology 48, 153-159, (2004).

Cyan inks for ink jet printing generally comprise copper phthalocyanine dyes such as Direct Blue 199, Direct Blue 86 or Direct Blue 87. Other phthalocyanine dyes used in ink jet printing are described by M. Fryberg in "Dyes for Ink Jet Printing", Review of Progress in Coloration 35, 1-30 (2005).

The phthalocyanine dyes described therein do not, however, meet all the necessary requirements, because images printed with these dyes onto nanoporous recording sheets do not have a sufficient stability against degradation by ozone.

The phthalocyanine dye of formula (I) is described in patent application JP 2003-213, 153 (example No. 134).

(I)

This copper phthalocyanine dye shows an improved stability against degradation by ozone in comparison to copper phthalocyanine dyes used before, but its hue is too greenish and the dye is not sufficiently brilliant.

Dyes used for the preparation of inks for ink jet printing need to have a good solubility in the essentially aqueous ink liquid, they have to penetrate into the recording sheet and should not show dye aggregation on the surface of the recording sheet ("bronzing"). They need to provide printed images having high optical density, good water fastness, good light stability and good storage stability even under adverse conditions. They need to be stable in the ink even when the ink is stored for a long time under adverse conditions.

Various types of ink compositions have been proposed. Typical inks comprise one or more dyes or pigments, water, organic cosolvents and other additives.

The inks have to satisfy the following criteria:

(1) The ink gives images of excellent quality on any type of recording sheet.

(2) The ink gives printed images exhibiting good water fastness.

(3) The ink gives printed images exhibiting good light stability.
(4) The ink gives printed images exhibiting excellent smudge behavior.
(5) The ink gives printed images exhibiting excellent storage stability under conditions of high temperature and humidity.
(6) The ink does not clog jetting nozzles of the ink jet printers even when these are kept uncapped while recording is suspended for long periods.
(7) The ink may be stored for long periods without deterioration of its quality.
(8) The values of the physical properties of the inks, such as viscosity, conductivity and surface tension are all within defined ranges well suited for the intended use.
(9) The ink has to be non-toxic, non-flammable and safe.

Compositions for cyan inks for ink jet printing comprising phthalocyanine dyes are described for example in patent applications EP 1,405,883, EP 1,473,335, EP 1,475,417 and US 2003/0,041,775.

There is therefore still a need for improved, brilliant phthalocyanine dyes giving images on nanoporous recording sheets with excellent stability against degradation by ozone and showing a suitable bluish, saturated hue.

SUMMARY OF THE INVENTION

We have now surprisingly found that novel phthalocyanine dyes show, at the same time, good stability against degradation by ozone, a suitable hue and high brilliance.

Accordingly it is an object of the invention to provide novel phthalocyanine dyes with high solubility and providing images on nanoporous recording sheets with improved hue and excellent stability against degradation by ozone.

Furthermore, the sharpness of the images does not or only slightly deteriorate during long periods of storage under conditions of high temperature and humidity. The images also have the other required properties such as high chroma, good light stability and excellent water fastness.

A further object of the invention is the provision of liquid dye preparations containing these phthalocyanine dyes, in particular of inks for ink jet printing.

Other objects, features and advantages of the present invention will be apparent when the detailed description of the preferred embodiment of the invention are considered with reference to the drawings which should be construed in an illustrative and not limiting sense as follows:

DESCRIPTION OF THE INVENTION

The present invention relates to novel phthalocyanine dyes of general formula (II), wherein $R_1$-$R_8$ independently represent a linear or branched alkyl group having up to 8 carbon atoms;

$R_9$-$R_{12}$ independently represent hydrogen, a linear or branched alkyl group having up to 8 carbon atoms or halogen;

Me represents copper, zinc, nickel, manganese, cobalt, aluminum or vanadium;

M represents hydrogen, a metal cation or an aromatic ammonium cation, which optionally may be substituted by one or more alkyl or substituted alkyl groups each having from 1 to 18 C atoms, or an aliphatic ammonium cation, which optionally may be substituted by one or more alkyl or substituted alkyl or hyxdoxyalkoxyalkyl groups, each having from 1 to 18 C atoms; and m, n, o, p independently are 1 or 2.

Phthalocyanine dyes, wherein Me represents copper (Cu) or zinc (Zn), are preferred.

Phthalocyanine dyes, wherein m, n, o and p are equal to 1, are also preferred.

Particularly preferred are symmetric phthalocyanine dyes of general formula (III), wherein 4 identical substituents are arranged around the central atom. In these dyes, m, n, o and p have the same value. The substituents $R_1$, $R_3$, $R_5$ and $R_7$ are identical, as well as the substituents $R_2$, $R_4$, $R_6$ and $R_8$ and, as well, the substituents $R_9$, $R_{10}$, $R_{11}$ and $R_{12}$. $R_1$, $R_2$, $R_{10}$, Me and m are as defined above.

wherein $R_3$, $R_4$, $R_{11}$ and n are as defined above; of general formula (IV C), The invention also relates to a method of preparation of the phthalocyanine dyes of general formula (II) according to the invention, wherein an aromatic amine of general formula (IV A), wherein $R_1$, $R_2$, $R_{10}$ and m are as defined above; of general formula (IV B), wherein $R_5$, $R_6$, $R_{12}$ and o are as defined above; and of general formula (IV D), wherein $R_7$, $R_8$, $R_{12}$ and p are as defined above, with the acyl chloride of formula (V)

(V)

under conditions that the amides of general formulas (VI A)

(VI B)

(VI C)

(VI D)

are formed.

A mixture of the amides (VI A), (VI B), (VI C) and (VI D) is reacted with a salt of metal Me for the preparation of the asymmetrical phthalocyanine dyes of general formula (II).

Suitable conditions for this reaction are described for example by M. Hanack, H. Heckmann and R. Polley in "Phthalocyanines and Related Compounds", Volume E 9d, pages 717-842 of Houben-Weyl, "Methods of Organic Chemistry", Georg Thieme Eitions Stuttgart New York (1998), ISBN 3-13-101614-0.

The amide of general formula (VI A) is reacted with a salt of metal Me for the preparation of the symmetrical phthalocyanine dyes of general formula (II).

The following phthalocyanine dyes of general formula (III) are specific examples:

(100)

-continued

(101)

(102)

(103)

(104)

(105) and (106)

The central metal atom Me is either copper or zinc, it will be indicated in Table 1.

The phthalocyanine dyes of general formulas (II) and (III) may be in the free acid form or in the form of inorganic or organic salts thereof. Preferably, they are in the form of their alkali or ammonium salts, wherein the ammonium cation may be substituted. Examples of such substituted ammonium cations are 2-hydroxyethylammonium, bis-(2-hydroxyethyl)-ammonium, tris-(2-hydroxyethyl)-ammonium, bis-(2-hydroxyethyl)-methylammonium, tris-[2-(2-methoxyethoxy)-ethyl]-ammonium, 8-hydroxy-3,6-dioxaoctylammonium, 1,8-diazabicyclo(5.4.0)undec-7-en, 1,4-diazabicyclo-(2.2.2)octane and tetraalkylammonium such as tetramethylammonium or tetrabutylammonium, or pyridinium.

The invention does not only relate to pure phthalocyanine dyes of general formulas (II) and (III), but also to mixtures of these phthalocyanine dyes.

The phthalocyanine dyes of general formulas (II) and (III) according to the invention are used for dying cellulose containing materials, paper, cotton, viscose, leather and wool to provide dyed materials with good water fastness and light stability.

All methods well known in the textile and paper industries for dyeing with substantive dyes may be used with the phthalocyanine dyes, preferably for the bulk or surface treatment of sized or unsized paper. The dyes may also be used in the dyeing of yarns and piece goods of cotton, viscose and linen by the exhaustion process from a long liquor or in a continuous process.

The invention furthermore relates to liquid dye preparations comprising at least one phthalocyanine dye of general formula (II) and/or general formula (III). The use of such liquid dye preparations is particularly preferred for paper dyeing. Such stable, liquid, preferably aqueous, concentrated dye preparations may be obtained by using methods well known in the art, preferably by dissolving in suitable solvents. The possibility of preparation of such stable, aqueous, concentrated preparations in the course of dye synthesis itself, without intermediate isolation of the dye, for example after a desalting step by diafiltration of the reaction solution, is of particular advantage.

Phthalocyanine dyes or mixtures of phthalocyanine dyes of general formulas (II) and (III) are excellent dyes for the preparation of cyan inks for ink jet printing.

These cyan inks may be used in a process for recording text and images on recording sheets and for dying and printing natural or synthetic fiber materials, nanoporous materials, leather and aluminum by applying thereto a phthalocyanine dye according to the invention.

The phthalocyanine dyes of general formulas (II) and (III) according to the invention may be combined with other cyan dyes, in particular Direct Blue 199, Direct Blue 86, Direct Blue 87, Acid Blue 9 and others described by M. Fryberg in "Dyes for Ink Jet Printing", Review of Progress in Coloration 35, 1-30 (2005).

Such a cyan ink comprises one or more of the phthalocyanine dyes according to the invention in a liquid aqueous medium. The ink contains from 0.5% to 20% by weight, preferably from 0.5% to 8% by weight, of these phthalocyanine dyes, based on the total weight of the ink. The liquid medium is preferably water or a mixture of water and water-miscible organic solvents. Suitable solvents are given for example in patents U.S. Pat. No. 4,626,284, U.S. Pat. No. 4,703,113 and U.S. Pat. No. 4,963,189 and in patent applications GB 2,289,473, EP 0,425,150 and EP 0,597,672.

The present invention will be illustrated in more detail by the following examples without limiting the scope of the claimed phthalocyanine dyes in any way.

EXAMPLES

Example 1

The symmetric copper phthalocyanine dye (100) was prepared in the following way:

6.7 g (30 mmoles) of the aniline of formula (VII), prepared according to the method described by G. P. Britovsek, G. Y. Y. Woo and N. Assavathorn in "Synthesis and reactivity of water-soluble platinum(II) complexes containing nitrogen ligands", Journal of Organometallic Chemistry 679, 110-115 (2003), were suspended in 25 ml of pyridine.

5.7 g (30 mmoles) of the acyl chloride of formula (VIII), prepared according to the method described by J. J. He, G. Benkö, F. Korodi, T. Polívka, R. Lomoth, B. Åkermak, L. Sun, A. Hagfeldt and V. Sundström in "Modified Phthalocyanines for Efficient Near-IR Sensitization of Nanostructured $TiO_2$ Electrode", Journal of the American Chemical Society 124, 4922-4932 (2002), dissolved in 8 ml of ethyl acetate, were added drop-wise under ice cooling to this suspension in such a manner that temperature never exceeded 30° C. After completion of the addition, the reaction mixture was stirred for 18 hours at room temperature. Afterwards, the mixture was diluted with 40 ml of ethyl acetate and the precipitate was suction filtered and purified by recrystallisation in 140 ml of methanol. 7.2 g of the amide of formula (IX) were obtained after drying.

7.0 g (16 mmoles) of the amide of formula (IX), 0.8 g (4 mmoles) of copper acetate monohydrate and 2.4 g of 1,8-diazabicyclo(5.4.0)undec-7-en in 20 ml of formamide were stirred for 5 hours at a temperature of 100° C. Afterwards, the deep-blue solution was cooled down to room temperature, diluted with 30 ml of methanol, the dye was precipitated as sodium salt by the addition of 3.0 g of sodium acetate and the precipitate was filtered off. 3.7 g of the sodium salt of the phthalocyanine dye (100) were obtained in this way.

In place of 1,8-diazabicyclo(5.4.0)undec-7-en other strong organic bases such as 1,4-diazabicyclo(2.2.2)octane may be used. In place of sodium acetate, the acetates or the chlorides of another alkaline metals, such as potassium acetate or lithium chloride, may be used. In this case, the phthalocyanine dye is obtained as potassium or lithium salt.

The symmetric phthalocyanine dyes (101) to (106) according to the invention may be prepared in a similar way by using appropriate quantities of appropriate starting materials.

Example 2

An asymmetric copper phthalocyanine dye was prepared in the following way:

7.7 g (30 mmoles) of the aniline of formula (X), prepared according to the method described by G. P. Britovsek, G. Y. Y. Woo and N. Assavathorn in "Synthesis and reactivity of water-soluble platinum(II) complexes containing nitrogen ligands", Journal of Organometallic Chemistry 679, 110-115 (2003), were suspended in 30 ml of pyridine.

5.7 g (30 mmoles) of the acyl chloride of formula (VIII) were added drop-wise under ice cooling to this suspension in such a manner that temperature never exceeded 30° C. After completion of the addition, the reaction mixture was stirred for 18 hours at room temperature. Afterwards, the mixture was diluted with 20 ml of N-methylpyrrolidone and 20 ml of ethyl acetate, filtered and concentrated. The raw product was purified by stirring in 50 ml of a concentrated solution of sodium chloride. 6.7 g of the amide of formula (XI) were obtained after drying.

3.5 g (8 mmoles) of the amide of formula (X) and 3.9 g (8 mmoles) of the amide of formula (XI), 0.8 g (4 mmoles) of copper acetate monohydrate and 2.4 g of 1,8-diazabicyclo (5.4.0)undec-7-en in 20 ml of formamide were stirred for 5 hours at a temperature of 100° C. Afterwards, the deep-blue solution was cooled down to room temperature, diluted with 30 ml of methanol, the dye was precipitated as sodium salt by the addition of 3.0 g of sodium acetate and the precipitate was filtered off. 3.3 g of the sodium salts of a mixture of phthalocyanine dyes were obtained in this way.

This mixture of phthalocyanine dyes contains, besides other dyes, the phthalocyanine dye of formula the phthalocyanine dye of formula the phthalocyanine dye of formula and the phthalocyanine dye of formula In the four preceding formulas, Me represents copper.

Example of Ink Preparation

The present invention, as far as it relates to inks, is illustrated by the following examples using the phthalocyanine dye (100) according to the invention and the phthalocyanine dye of formula (I) representing the state of the art. For each dye, 100 g of ink were prepared by heating the necessary amount of phthalocyanine dye (4 g-8 g), ethylene glycol (12 g), propylene glycol (6 g), N-methylpyrrolidone (6 g), Tergitol 15-S-7 (0.5 g, available from Union Carbide Co., Houston, USA) and a solution of the biocide Mergal K 10N (0.2 g, available from Riedel-de-Haën, Seelze, Germany) together with water at a temperature of 50° C. under stirring for approximately 1 hour. The resulting solution was cooled down to a temperature of 20° C., its value of pH was adjusted to 7.5 and the solution was passed through a Millipore® filter of 0.5 μm pore diameter. The dye quantity was adjusted in such a way that the optical density of the printed image was similar for the two phthalocyanine dyes.

Examples of Ink Application

Colored squares of 1 cm² were then printed with these inks onto the nanoporous recording sheets ILFORD Galerie® Smooth Gloss Paper IGSGP9 and ILFORD Printasia® Premium Photo Glossy Paper PRNGP1 with an ink jet printer Canon 8500. The printed samples were dried for 24 hours in air having a relative humidity of about 60%.

Tests

1. Absorption Maximum in Aqueous Solution

The absorption maximum in aqueous solution were measured at a concentration of 20 mg/l to 30 mg/l of dye in an optical cell of 1 cm thickness with a spectrometer Kontron Uvikon® at a value of pH of 7.0.

2. Spectral Absorption on Nanoporous Recording Sheets

The spectral absorption of the colored squares with a density between 1.3 and 1.5 was registered with a remission densitometer Spectrolino®, available from Gretag Macbeth, Regensdorf, Switzerland. The absorption spectra were afterwards normalized.

3. Stability Against Ozone Degradation in the Dark

The optical density of the colored squares was measured with a densitometer Spectrolino®, available from Gretag Macbeth, Regensdorf, Switzerland. Afterwards, the printed samples were stored for de predetermined time (for example 12 hours) in an ozone chamber, model 903, available from Satra/Hampden, Great Britain, at a temperature of 30° C., a relative humidity of 50% of the air and an ozone concentration of 1 ppm at a velocity of the circulating, ozone containing air of 13 mm/s. After storage, the samples were remeasured. The density difference of these two measurements, expressed as percent of the initial density, is an indication of the amount of dye loss due to the exposure to ozone.

Figure 1:
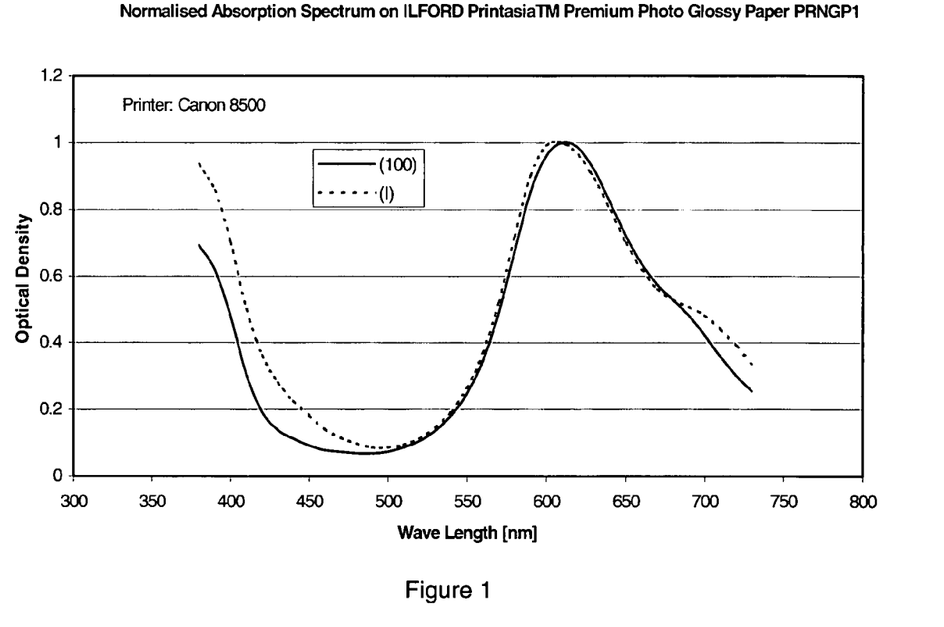
FIG. 1 shows the normalized absorption spectra of the phthalocyanine dye according to the invention on a nanoporous recording sheet.

The normalized absorption spectra of the phthalocyanine dye (100) according to the invention and of the phthalocyanine dye of formula (I) on the nanoporous recording sheet ILFORD Printasia® Premium Photo Glossy Paper PRNGP1 are presented in FIG. 1.

Figure 2:
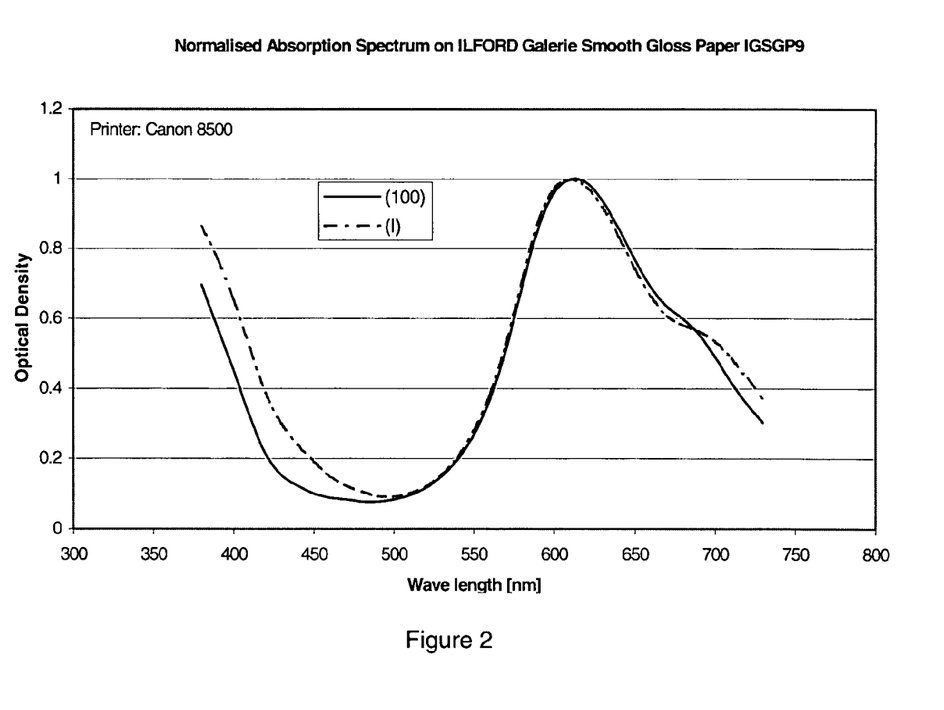
FIG. 2 shows the normalized absorption spectra of the phthalocyanine dye according to the invention on another nanoporous recording sheet.

The normalized absorption spectra of the phthalocyanine dye (100) according to the invention and of the phthalocyanine dye of formula (I) on the nanoporous recording sheet ILFORD Galerie® Smooth Gloss Paper IGSGP9 are presented in FIG. 2.

Results

The measured absorption maximum of the phthalocyanine dyes according to the invention are presented in Table 1 for different metals Me and different metal cations M.

TABLE 1

| Dye No. | Me | M | $\lambda_{max}$ in $H_2O$ (nm) |
|---|---|---|---|
| 100 | Cu | K | 601 |
| 101 | Cu | Na | 617 |

TABLE 1-continued

| Dye No. | Me | M | $\lambda_{max}$ in H$_2$O (nm) |
|---|---|---|---|
| 101 | Cu | Li | 616 |
| 101 | Cu | K | 617 |
| 102 | Cu | Na | 622 |
| 102 | Cu | Li | 621 |
| 103 | Cu | Na | 585 |
| 104 | Cu | Na | 605 |
| 105 | Cu | Na | 614 |
| 105 | Cu | Li | 614 |
| 106 | Cu | Na | 681 |
| 101 | Zn | K | 639 |

The absorption maximum of dye (106) was measured in a 1:1 mixture of water and N-methylpyrrolidone.

A comparison of the normalized absorption spectra immediately shows that the phthalocyanine dye (100) according to the invention has a considerably lower secondary absorption in the wavelength region between 400 nm and 500 nm than the phthalocyanine dye of formula (I) representing the state of the art. This is the reason why the phthalocyanine dye (100) according to the invention has the required bluish hue on the nanoporous recording sheets ILFORD Galerie® Smooth Gloss Paper IGSGP9 and ILFORD Printasia® Premium Photo Glossy Paper PRNGP1 in comparison to the phthalocyanine dye of formula (I) representing the state of the art, which has an unwanted greenish hue. Furthermore, the phthalocyanine dye (100) according to the invention is considerably more brilliant in comparison to the phthalocyanine dye of formula (I) representing the state of the art.

This means in ink jet printing that originals having brilliant, saturated blues may be reproduced much better by using the ozone resistant phthalocyanine dyes according to the invention in comparison to the use of the ozone resistant phthalocyanine dye of formula (I) representing the state of the art, where only dull, greenish-blue hues may be obtained.

The determined values of density losses at an ink coverage of 80%, due to the exposure to ozone for a storage period of 24 hours, for the recording sheet ILFORD Galerie® Smooth Gloss Paper IGSGP9 are listed in Table 2.

TABLE 2

| Dye No. | Density loss in % |
|---|---|
| (100) | 11 |
| (I) | 10 |

The determined values of density losses at an ink coverage of 80%, due to the exposure to ozone for a storage period of 24 hours, for the recording sheet ILFORD Printasia® Premium Photo Glossy Paper PRNGP1 are listed in Table 3.

TABLE 3

| Dye No. | Density loss in % |
|---|---|
| (100) | 7 |
| (I) | 8 |

A comparison of the measured dye losses in Tables 2 and 3 immediately shows that inks containing the phthalocyanine dye (100) according to the invention have the same stability against ozone degradation than inks containing the phthalocyanine dye of formula (I) representing the state of the art and having a too greenish hue.

This means in ink jet printing that images having a good stability against ozone degradation and pure, saturated blue hues may be obtained with the phthalocyanine dyes according to the invention in comparison to the use of the ozone resistant phthalocyanine dyes representing the state of the art, where only dull, greenish-blue hues may be obtained.

Finally, variations from the examples given herein are possible in view of the above disclosure. Therefore, although the invention has been described with reference to certain preferred embodiments, it will be appreciated that other dyes may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:

1. Phthalocyanine dyes of general formula (II)

wherein
- $R_1$-$R_8$ independently represent a linear or branched alkyl group having up to 8 carbon atoms;
- $R_9$-$R_{12}$ independently represent hydrogen, a linear or branched alkyl group having up to 8 carbon atoms or halogen;
- Me represents copper, zinc, nickel, manganese, cobalt, aluminum or vanadium;
- M represents hydrogen, a metal cation or an aromatic ammonium cation, which optionally may be substituted by one or more alkyl or substituted alkyl groups each having from 1 to 18 C atoms, or an aliphatic ammonium cation, which optionally may be substituted by one or more alkyl or substituted alkyl or hydroxyalkoxyalkyl groups, each having from 1 to 18 C atoms; and
- m, n, o, p independently are 1 or 2.

2. Phthalocyanine dyes according to claim 1, wherein $R_1$-$R_8$, $R_9$-$R_{12}$, Me and M are as defined in claim 1 and m, n, o, p are equal to 1.

3. Phthalocyanine dyes according to claim 1, wherein $R_1$-$R_8$, $R_9$-$R_{12}$, m, n, o, p and M are as defined in claim 1 and
Me represents copper or zinc.

4. Phthalocyanine dyes of general formula (III) according to claim 1, (III)

wherein
$R_1$, $R_2$, $R_{10}$, Me, M and m are as defined in claim 1.

5. Phthalocyanine dyes according to claim 4, wherein $R_1$, $R_2$, $R_{10}$, Me and M are as defined in claim 4 and m is equal to 1.

6. Phthalocyanine dyes according to claim 4, wherein $R_1$, $R_2$, $R_{10}$, m and M are as defined in claim 4 and Me represents copper or zinc.

7. Method of preparation of the phthalocyanine dyes according to claim 1, wherein
an aromatic amine of general formula (IV A), (IV A)

wherein $R_1$, $R_2$, $R_{10}$ and m are as defined in claim 1;
of general formula (IV B), (IV B)

wherein $R_3$, $R_4$, $R_{11}$ and n are as defined in claim 1;

of general formula (IV C), (IV C)

wherein $R_5$, $R_6$, $R_{12}$ and o are as defined in claim 1; and
of general formula (IV D), (IV D)

wherein $R_7$, $R_8$, $R_{12}$ and p are as defined in claim 1,
is reacted with the acyl chloride of formula (V)

(V)

under conditions that the amides of general formulas (VIA)

(VIB)

(VIC)

(VID)

are formed, and
a mixture of the amides of general formulas (VIA), (VIB), (VI C) and (VI D) is reacted with a salt of Metal Me.

8. Process for recording text and images on recording sheets and for dying and printing natural or synthetic fiber materials, nanoporous materials, leather and aluminum by applying thereto a phthalocyanine dye according to claim 1.

9. Liquid dye preparations comprising at least one phthalocyanine dye or a mixture of phthalocyanine dyes according to claim 1.

10. Inks for ink jet printing, comprising at least phthalocyanine dye or a mixture of phthalocyanine dyes according to claim 1.

11. Inks for ink jet printing according to claim 10 further comprising one or more other dyes.

* * * * *

UNITED STATES PATENT AND TRADEMARK OFFICE
CERTIFICATE OF CORRECTION

PATENT NO. : 7,632,345 B2  Page 1 of 1
APPLICATION NO. : 11/818231
DATED : December 15, 2009
INVENTOR(S) : Kurt Baettig et al.

It is certified that error appears in the above-identified patent and that said Letters Patent is hereby corrected as shown below:

In the specification at:

Col. 2 line 19 delete the formula and insert the following formula

Signed and Sealed this

Sixth Day of July, 2010

David J. Kappos
*Director of the United States Patent and Trademark Office*